Figure 2:
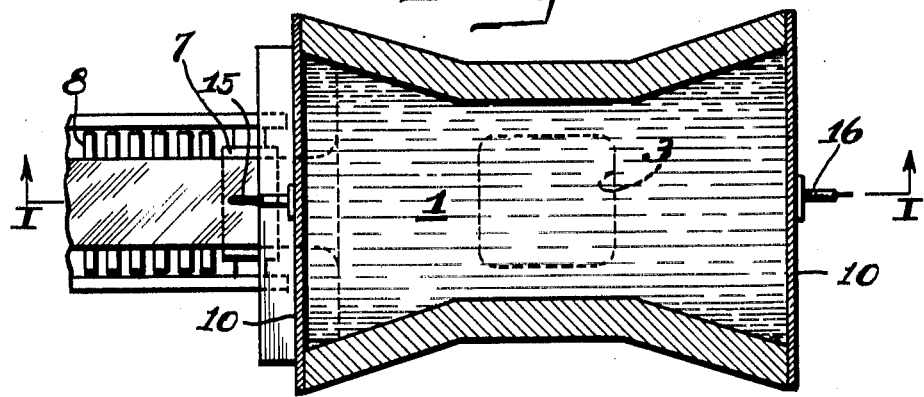

Nov. 1, 1932.  H. F. HITNER  1,885,722

PROCESS OF MELTING GLASS BY ELECTRICITY

Filed Sept. 27, 1930   2 Sheets-Sheet 1

INVENTOR

Nov. 1, 1932.  H. F. HITNER  1,885,722
PROCESS OF MELTING GLASS BY ELECTRICITY
Filed Sept. 27, 1930  2 Sheets-Sheet 2
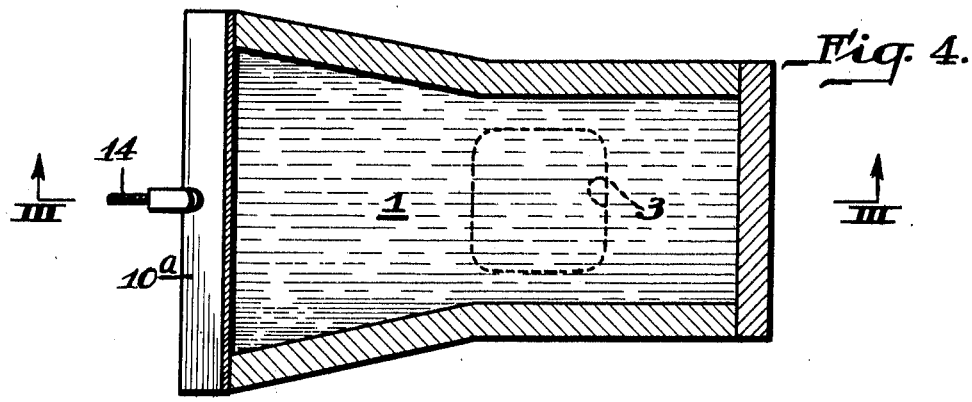
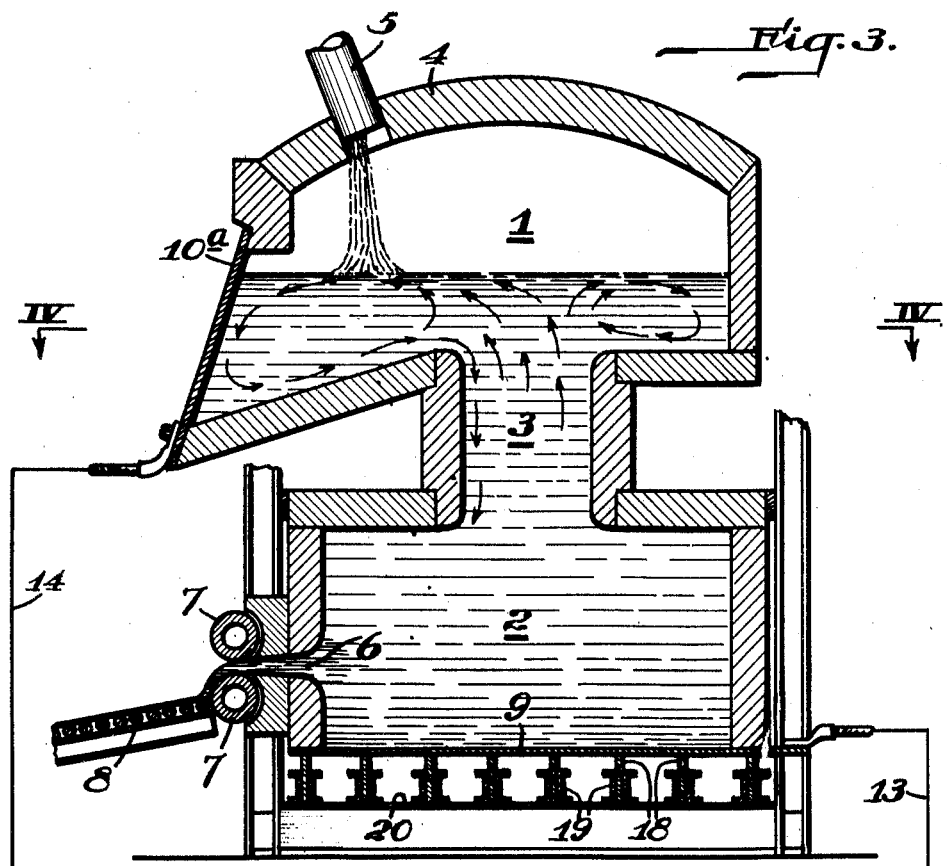
INVENTOR Patented Nov. 1, 1932

1,885,722

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

PROCESS OF MELTING GLASS BY ELECTRICITY

Application filed September 27, 1930. Serial No. 484,794.

Figure 1:
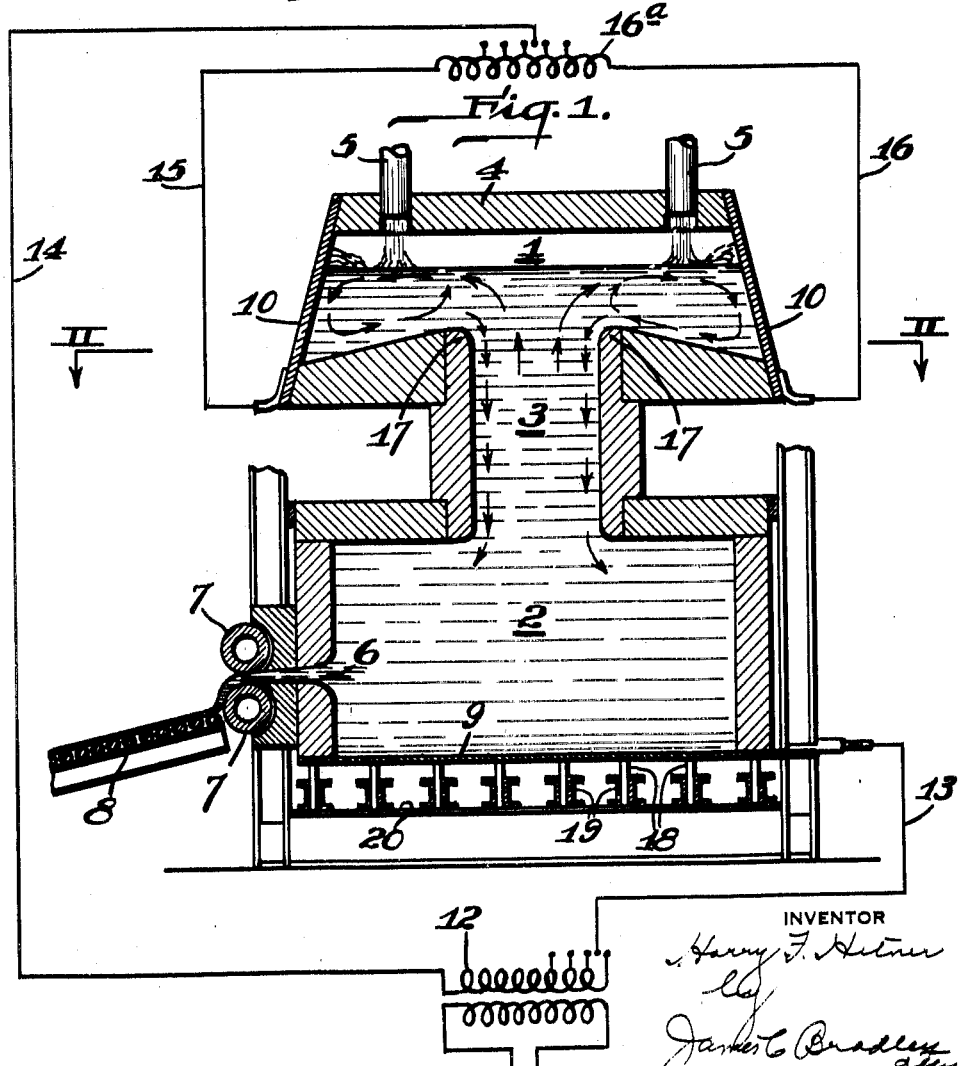

The invention relates to a process of making glass by the use of electricity as a melting and refining agent, the present application constituting, in part, a continuation of my application, Serial No. 432,072. The invention has for its primary objects, the provision of an improved process, wherein (1) a very rapid melting of the batch is secured, (2) a complete separation of the reduced and finished glass from the partially finished glass is secured, (3) a circulation of glass in the tank is secured in such manner as to carry the batch fed into the tank toward the electrodes so as to cool and protect such electrodes, (4) the flow of electric current through different parts of the glass bath is equalized, and (5) whereby a maximum reduction of batch per unit of electric power is secured. I have found that the foregoing results are best achieved by causing the reducing current to pass vertically through a relatively deep body of glass in such manner that a high current density is applied through a relatively small cross section of glass, thus producing a vigorous reaction or boiling accompanied by a rapid circulation of the glass. This procedure promotes an effective separation of the finished glass and the glass which contains unmelted batch and a large amount of gas. The finished glass being relatively free from gas and having a high specific gravity moves downward from the highly heated and agitated area, while the lighter unfinished glass moves upward and is maintained in the area of greatest heat until a further reduction occurs. Normally, the flow of glass upward occurs through the central portion of the area of reduced cross section and the down flow occurs through the portions of the area surrounding the central area. This produces a very desirable circulation of glass in the upper end of the tank when plate electrodes are used, since a surface flow of glass toward the electrodes is secured, thus carrying the batch which is fed into the top of the tank (and floats on the glass) toward the electrodes, combined with a reverse flow beneath such surface flow. The batch is thus made to assist in cooling the electrodes near the surface of the glass where overheating and corrosion is liable to be the greatest, and the circulation of glass past the electrodes also assists in maintaining a lower electrode temperature than is the case where no movement of the glass occurs past the surfaces of the electrodes. The cooling effect of the batch is also increased by feeding it in relatively close to the electrodes. Certain forms of apparatus for practicing the improved process are illustrated in the accompanying drawings, wherein:

Figure 1 is a vertical section through one form of the furnace on the line I—I of Fig. 2.
Fig. 2 is a section on the line II—II of Fig. 1.
Fig. 3 is a vertical section through another form of furnace on the line III—III of Fig. 4. And Fig. 4 is a section on the line IV—IV of Fig. 3.

Referring first to the arrangement of Figs. 1 and 2, the tank shown is constructed with walls of refractory material and comprises an upper chamber 1 and a lower chamber 2 connected by a neck 3 whose horizontal cross section is less than that of the two chambers. Batch is supplied through the furnace arch 4 through the chutes 5, 5 and the molten glass is withdrawn from the lower chamber 2 through the outlet 6 passing in a sheet or ribbon between the water cooled rolls 7, 7 and onto a roller apron 8 from which it is conducted through a leer not shown. It will be understood that any suitable means may be used for utilizing the glass from the lower chamber 2, the present invention relating merely to the means for melting the glass and getting it into condition for use rather than to the means for utilizing it.

Current is supplied through the glass in the tank from the three plate electrodes 9 and 10. These electrodes are connected to the transformer coil 12 by means of the leads 13, 14, 15, and 16. An auto transformer 16ª is preferably used between the lead 14 and the leads 15 and 16, so that a balancing effect is automatically secured between the two electrodes 10, 10 and the electrode 9, the flow of current from the two electrodes 10 and the electrode 9 being equally divided. This makes the heating conditions in the furnace more uniform and reduces the danger of overheating of either of the electrodes 10, 10. As shown, single phase current is employed and the flow of current occurs between the electrodes 10, 10 on the one hand and the electrode 9 on the other, so that all of the current passes through the neck portion 3 of the tank.

Due to the reduced cross section of the neck 3 as compared with the chambers 1 and 2, the current exercises its greatest heating effect in the neck and a vigorous boiling action occurs here and in the body of glass immediately above the neck. This gives a degree of heat sufficient to completely reduce the batch in a very short period of time, and the boiling action in the neck and immediately above such neck serves to separate the unmelted portions of the batch from the completely melted portions. The completely finished glass settles into the chamber 2 because of its lower specific gravity, while the unfinished glass having a much higher specific gravity due to the gases in solution and to the unmelted batch mixed through the glass tends to rise into the chamber 1, where in the course of time it becomes completely reduced. The boiling action in connection with the differences in temperature of the glass in the tank sets up a vigorous circulation along the path indicated by the arrows in Fig. 1. The heating of the glass in the neck 3 causes it to flow up through the center of such neck to the surface of the glass where it turns laterally and moves over to the electrodes 10. Arriving at such electrodes, the flow turns downward, as indicated by the arrows and then passes back to the center of the tank so that a downward flow occurs along the sides of the neck, the glass which thus flows down being the finished glass from which the contained gases have been expelled to a large degree. The temperature in the chamber 2 is substantially below that in the neck 3 and in the chamber 1, the difference in temperature ranging from 200 to 400 degrees F. At these lower temperatures, any free gas remaining in the glass is absorbed thereby so that the glass is substantially free from seed and bubbles when it is withdrawn through the outlet 6.

The surface flow of glass in the chamber 1 toward the electrodes 10, 10 serves to carry the batch supplied through the chutes 5, 5 against the electrodes and the batch as thus carried against the electrodes serves to cool such electrodes and protect them from heating and corrosion at the surface of the glass where ordinarily any destructive corrosion or overheating occurs. The flow of cooled glass and semi-melted batch downward over the electrodes also tends to keep them from overheating. As heretofore indicated, the reverse flow of glass in the upper chamber 1 carries the glass back to the neck 3 and any glass which is finished and has a relatively high specific gravity will move down through the neck as indicated by the arrows. That portion of the glass, however, which is not finished, will not settle through the neck, but will continue to circulate in the upper portion of the tank until it is completely reduced. The effective operation of the tank is dependent upon the vigorous boiling action secured in the neck 3 combined with the circulation above described and this result is secured by adjusting the current so as to give the necessary density per unit of cross sectional area. Under these conditions, the furnace may be operated at full capacity without overheating the electrodes 10, 10. In operation, the temperature of the glass through the central portion of the neck 3 and at the surface of the bath in the chamber 1 is greater than in other portions of the tank so that the current flow between the electrodes 9, and 10, 10 follows this path and the corrosion at the corners 17, 17 of the neck is less than would be expected when it is considered that the shortest path between the electrodes 10, 10 and the electrode 9 is close to these corners. If desired, the batch may be supplied through the center of the furnace arch 4, as shown in my application heretofore referred to, but the arrangement as indicated in Fig. 1 wherein the batch is supplied adjacent the electrodes 10, 10, is preferred as I have found that the cooling effect incident to the introduction of the batch is improved by locating the electrodes in the position shown in this application.

The electrodes 9, and 10, 10 are preferably of nickel chromium alloy, which will not discolor the glass under heat conditions normally present in the tank, and such plates are kept cool by direct exposure to the atmosphere on their outer sides. In order to support the bottom electrode 11, which becomes highly heated and would otherwise sag, a series of plates 18 are employed carried between the channel bars 19, 19, such channel bars being supported in turn upon the transverse channels 20.

Figs. 3 and 4 illustrate a modification in which the construction follows that of Figs. 1 and 2 except that a single electrode 10a is used in connection with the upper chamber 1 instead of the two electrodes 10, 10 of the Fig. 1 construction. In other respects this construction is the same throughout as that of Figs. 1 and 2 and the same reference numerals are used for similar parts. The term "glass" is used herein in its broad sense to cover materials which have many, if not all, the characteristics of common glass but which are not usually so designated, such as the vitreous enamels, which are a species of glass, and silicate of soda, which is sometimes referred to as soluble glass. The process in all of its phases is just as applicable for fusing these materials as those which are always referred to as glass.

What I claim is:

1. A process of melting glass which consists in maintaining a body of molten glass of substantial depth, causing a flow of electric current vertically through the body having its maximum density centrally of said body, so as to produce a boiling action in the glass with an upward flow thereof centrally of the body and a downward flow outward from the central portion, supplying batch to the upper end of the body, and withdrawing glass from the lower end thereof.

2. A process of melting glass which consists in maintaining a body of molten glass having a horizontal cross section intermediate its upper and lower ends which is less than that of said ends, passing a current of electricity vertically through the body so as to produce a boiling action in the glass lying in the area of reduced cross section intermediate the ends of the body, supplying batch to the upper end of the body and withdrawing glass from the body at a point below the area of reduced cross section.

3. A process of melting glass which consists in maintaining a body of molten glass having a horizontal cross section intermediate its upper and lower ends which is less than that of said ends, passing a current of electricity vertically through the body so as to produce a boiling action in the glass lying in the area of reduced cross section intermediate the ends of the body and in the glass just above such area, supplying batch to the upper end of the body and withdrawing glass from the lower end thereof.

4. A process of melting glass which consists in maintaining a body of molten glass having a horizontal cross section intermediate its upper and lower ends which is less than that of said ends, passing a current of electricity vertically through the body so as to produce a boiling action in the glass lying in the area of reduced cross section intermediate the ends of the body accompanied by an upward flow of the glass through the central portion of said area and a downward flow of the glass through the outer portions of said area, supplying batch to the upper end of the body and withdrawing glass from the lower end thereof.

5. A process of melting glass which consists in maintaining a body of molten glass having a horizontal cross section intermediate its upper and lower ends which is less than that of said ends, passing a current of electricity vertically through the body so as to produce a boiling action in the glass lying in the area of reduced cross section intermediate the ends of the body and a separation at such point of the partially reduced glass, which moves upward from the completely reduced glass which moves downward, supplying batch to the upper end of the body and withdrawing glass from the lower end thereof.

6. A process of melting glass which consists in maintaining a body of molten glass having a horizontal cross section intermediate its upper and lower ends which is less than that of said ends in contact with electrodes, one of which contacts with the glass at the lower end of said body, and the other of which contacts with the glass at the side of such body above the area of reduced cross section, supplying current to the electrodes so that a flow thereof occurs vertically through the glass in the area of reduced cross section and laterally through the glass above such area, feeding batch to the upper end of the body adjacent to the electrode at the side of the body, and withdrawing glass from the body at a point below the area of reduced cross section, the amount of current supplied being such as to cause a boiling action in the glass at the area of reduced cross section accompanied by an upward flow of glass through one portion of such area of reduced cross section, a lateral flow of surface glass toward the upper electrode, a second lateral flow of glass in the reverse direction beneath the first lateral flow, and a downward flow of glass through the area of reduced cross section in the portion of said area lying to one side of the portion in which upward flow occurs.

7. A process of melting glass which consists in maintaining a body of molten glass having a horizontal cross section intermediate its upper and lower ends which is less than that of said ends, passing a current of electricity vertically through the body so as to produce a boiling action in the glass lying in the area of reduced cross section intermediate the ends of the body, supplying batch to the upper end of the body and withdrawing glass from the body at a point below the area of reduced cross section, the temperature of the glass lying below said reduced area being kept substantially below the temperature of the glass lying above said area.

In testimony whereof, I have hereunto subscribed my name this 8th day of September, 1930.

HARRY F. HITNER.